Patented June 10, 1930

1,763,435

UNITED STATES PATENT OFFICE

AXEL RUDOLF LINDBLAD, OF DJURSHOLM, SWEDEN

METHOD OF TREATING ARSENIOUS ORE

No Drawing. Application filed December 1, 1927, Serial No. 237,127, and in Sweden June 10, 1927.

The present invention relates to a new method of treating ores rich in arsenic.

According to methods hitherto generally used the ore is first roasted in order to get rid of the arsenic, which during the roasting process passes off as arsenious acid, after which the ore in one way or another is treated further, generally by smelting. The arsenous acid obtained is, however, frequently a great drawback for the work, inasmuch as, at least occasionally, it is difficult or absolutely impossible to sell it, and it has therefore to be stored. To throw away the arsenious acid is out of the question, on account of its being extremely poisonous.

The present invention refers to a method by which these difficulties are obviated by the arsenic being transferred to slag, which without any risk can be thrown away. This is done in such a manner that the ore under access of air is heated together with some substance which possesses a capacity of binding a greater or smaller part of the ore's arsenic as arsenite or arseniate, after which the ore thus treated is treated further by smelting in the ordinary manner, care being taken that the necessary slag forming substances are present, so that the arsenic in the form of an arseniate will pass into the slag and thus mix with the other components thereof. This slag is insoluble in water and innocuous, and can be thrown away without having to take any precautionary measures.

It has also been proposed to carry out the process in such a manner that the arsenic forms soluble compounds, for instance, compounds of sodium which by a leaching process may be dissolved out from a speiss obtained by the process. These soluble arsenic compounds are, however, also poisonous and therefore deleterious The roasting of the arsenious ore may best be done together with some basic substance or basic substance combined with some weak acid, e. g. carbonic acid. It will probably as a rule be cheapest to make use of limestone or burned, unslaked or slaked lime. The ore, which should preferably be rather finely crushed, is mixed with the lime and roasting is then carried out in the ordinary manner, e. g. in a mechanical roasting furnace. If the ore is arsenious pyrites, the arsenic passes off already at a low temperature before the sulphur. This issuing arsenic is in the presence of the lime easily oxidized by the oxygen of the air during the formation of calcium arseniate. The roasting can then, if necessary, be continued in order to also expel that portion of the sulphur which it is desired to get rid of. The roasted ore is then smelted, after a possible admixture of a basil slag or other silicate, in a shaft-furnace or flame-furnace, and treated further in some known manner.

In this process the slag must be kept rather basic. If too much acid substances are added, e. g. silicious acid, the risk is run that some of the arsenious acid is driven off by the heat. The slag must also be protected against too strong an influence of reducing substances, for there is otherwise a risk that some of the arsenious acid is reduced and passes off as arsenious acid or as metal. Smelting therefore takes place preferably in a flame-furnace where there is a possibility of keeping an oxidizing atmosphere. If these precautionary measures are adopted quite a high arsenic content can be obtained in the slag, and it is possible in this manner to get rid of at least a large portion of the arsenic in the ore.

In order to make the description of the process still clearer, the following example is given.

A quantity of arsenious ore containing, for example, about 9% of arsenic, 3% of copper, 26% of sulphur and varying amounts of silver and gold, is mixed with about 5% of burnt lime and the mixture roasted in the usual manner. If the roasting process is carried out in a proper way, the greater part of the lime is combined with the arsenious acid formed during the roasting with the result that calcium arsenite is formed, and only a minor part of the lime is combined with the sulphur. During the continuation of the roasting process, the calcium arsenite is oxidized to arseniate. If the thus roasted product is then smelted in a flame furnace in the presence of an oxidizing flame, a substantial part of the arseniate will pass into the slag which is capable of taking up from 5–6% of $As_2O_3$ in the form of the arseniate. In this manner the amount of arsenic which must be dealt with is reduced to about half of the amount originally occurring in the ore.

Having thus described my invention, I declare, that what I claim is:

1. A method of treating arsenic containing ore, which comprises roasting the ore in the presence of air together with substances adapted to unite with the arsenic in the ore to form insoluble arseniates, smelting the resulting product in the presence of slag forming substances, and removing with the slag such arseniates as have entered thereinto.

2. A method of treating arsenic containing ore, which comprises roasting the ore together with basic substances adapted to form substantially insoluble compounds with arsenic, smelting the resulting product in the presence of slag forming substances, and removing with the slag such insoluble arsenic compounds as have entered thereinto.

3. A method of treating arsenic containing ore, which comprises roasting the ore together with basic substances combined with a weak acid and adapted to form substantially insoluble compounds with arsenic, smelting the resulting product in the presence of slag forming substances, and removing with the slag such insoluble arsenic compounds as have entered thereinto.

4. A method of treating arsenic containing ore, which comprises roasting the ore together with a quantity of calcareous material, smelting the resulting product in the presence of slag forming substances, and removing with the slag such arsenic compounds as have entered thereinto.

5. A method of treating arsenic containing ore, which comprises roasting the ore together with burnt lime, smelting the resulting product in the presence of slag forming substances, and removing with the slag such arsenic compounds as have entered thereinto.

In testimony whereof I affix my signature.

AXEL RUDOLF LINDBLAD.